United States Patent [19]

Ullmann et al.

[11] 4,096,394

[45] Jun. 20, 1978

[54] APPARATUS FOR SUPPLYING ELECTRICAL ENERGY TO A LOAD

[75] Inventors: Werner Ullmann, Locarno; Renato Derighetti, Losone, both of Switzerland

[73] Assignee: A.G. fur industrielle Elektronic AGIE, Locarno, Switzerland

[21] Appl. No.: 650,970

[22] Filed: Jan. 21, 1976

[30] Foreign Application Priority Data

Mar. 25, 1975 Switzerland .................. 3828/75

[51] Int. Cl.² .......................... H02J 3/32; H02J 3/34
[52] U.S. Cl. .......................... 307/46; 307/48; 307/64; 307/65; 307/66
[58] Field of Search ............ 307/64, 65, 66, 44, 307/45, 46, 47, 48

[56] References Cited

U.S. PATENT DOCUMENTS

| 3,257,603 | 6/1966 | Laube | 307/48 |
| 3,489,915 | 1/1970 | Engelhardt | 307/66 |
| 3,612,894 | 10/1971 | Schmidt | 307/64 |
| 3,662,182 | 5/1972 | Ullmann et al. | 307/64 |
| 3,705,340 | 12/1972 | Weisser | 307/44 |
| 3,761,733 | 9/1973 | Wolpert | 307/64 |
| 3,886,438 | 5/1975 | Bouman | 307/44 |
| 3,971,957 | 7/1976 | Hase | 307/64 |
| 3,986,098 | 10/1976 | Tamii et al. | 307/64 |

*Primary Examiner*—Robert K. Schaefer
*Assistant Examiner*—Eugene S. Indyk
*Attorney, Agent, or Firm*—Flynn & Frishauf

[57] ABSTRACT

A main and an auxiliary energy supply device supply energy to a load normally and during disturbances of the main supply respectively while, for bridging brief disturbances in the load supply, for example naturally brief disturbances or during the short time when a disturbance has begun and the auxiliary supply has not yet come into operation, there is provided an energy store which can receive and store energy from the main supply and make this stored energy quickly available to the load. A control logic system controls the main and auxiliary supply devices and the storage means to ensure substantially constant energy supply to the load. The disturbances in question may comprise voltage rises or reductions and/or waveform distortions for example.

10 Claims, 6 Drawing Figures

APPARATUS FOR SUPPLYING ELECTRICAL ENERGY TO A LOAD

INTRODUCTION

The invention relates to an apparatus for continuously supplying electrical energy to at least one load and is more particularly concerned with the supply of energy to loads, such as data processing systems, radar apparatus, laboratory equipment or the like, for which the energy supply has to be maintained or guaranteed at all times during operation of the load.

BACKGROUND, AND PRIOR ART

In the journal "SEV-Bulletin" No. 63, part 21, 1972, there is a review of maintained energy supply systems for such loads. These systems have either a standby generator set or a continuous current supply installation provided between the normal main energy supply system and the loads. In a system with a standby generator set the energy is usually provided by the main supply while the standby set is "off" but, if the main supply fails or is disturbed (e.g. resulting in a voltage reduction), the standby set automatically comes into operation to maintain the proper supply. The standby or auxiliary energy source consists for example, of one or more diesel engines with generator(s) or of one or more inverters and batteries. A system such as this has a relatively high efficiency but there is invariably a substantial time lag between the detection of failure or disturbance of the main supply and the resultant bringing into operation of the auxiliary supply and this is often undesirable particularly in the case of loads which are sensitive to even very brief voltage fluctuations (some loads of the kind referred to are affected by voltage fluctuations having a duration even shorter than a quarter cycle of the of the alternating waveform of the energy supply). Furthermore, in the known systems of the kind described above, the auxiliary supply only comes into operation when the main supply fails or its voltage fails to an unacceptable level while distortion of the supply waveform and voltage increases for example are ignored.

The other kind of maintained energy supply system, i.e. those comprising so-called continuous current supply installation, were produced in order to overcome the above-mentioned disadvantage of the auxiliary generator system. In them, an energy store is provided between the load and the normal energy supply system. This store receives energy from the main supply system and gives it up to the loads during normal operation. i.e. so that in effect, the store can be regarded as the energy supply for the load at all times but normally the store is itself being replenished by the main supply. If the main supply fails, the store can nevertheless maintain the supply of energy to the load (until of course the main supply has been out of action for so long at any one time that the store becomes empty). Due to this "interposition" of energy sources, the loads are completely independent of any disturbances, e.g. voltage reductions or voltage rises, and distortion, emanating from the main energy supply system. However, the great disadvantage of such systems is their low efficiency, so that the cost of supplying energy to complicated loads is enormously increased.

The invention has for its object to retain the advantages of a continuous energy supply system and yet to achieve the maximum possible efficiency.

SUBJECT MATTER OF THE INVENTION

The apparatus comprises energy supply means which includes an output capacitor portion for connection to the load and main and auxiliary energy supply devices each connected to said output conductor portion for supplying energy to the load, normally and during disturbances of the main energy supply respectively, the apparatus further including energy storage means connected for receiving and storing energy from said supply means and for making such stored energy quickly available to said load for bridging brief disturbances in the supply of energy to the load from said energy supply means.

Preferably, the apparatus further includes an isolating device for example an a.c. switch and a filter (advantageously with an overvoltage limiter also) connected between said energy storage means and the main energy supply device for preventing energy from the energy storage means from flowing into the main energy supply device. The storage means may comprise input/output conductor means by way of which energy passes to and from the storage means, the said input/output conductor means being connected to said output conductor portion so that energy passing from the said supply means to the storage means and energy passing from the storage means to the load travels by way of said output conductor portion. The storage means can comprise an energy store and first and second switch means which are connected between the energy store and the energy supply means and are operable for controlling the flow of energy respectively to and from the energy store. There may be control means which is connected to said storage means, said isolating device and said auxiliary energy supply device and which comprises a desired signal generator for generating a signal having a characteristic which it is desired that the energy supplied to said load should also have, comparator means for comparing the energy supplied to the load and said signal, and control logic means connected to said comparator means and operable for evaluating the voltage and current levels (preferably the half-wave current level and also the energy flow direction) of the energy supplied to said load and for controlling said storage means, said isolating device and said auxiliary energy supply device in dependence upon the said levels.

DESCRIPTION OF THE DRAWINGS

For a better understanding of the invention and to show how the same may be carried into effect, reference will now be made, by way of example, to the accompanying drawings, in which.

DETAILED DESCRIPTION

Figure 1:
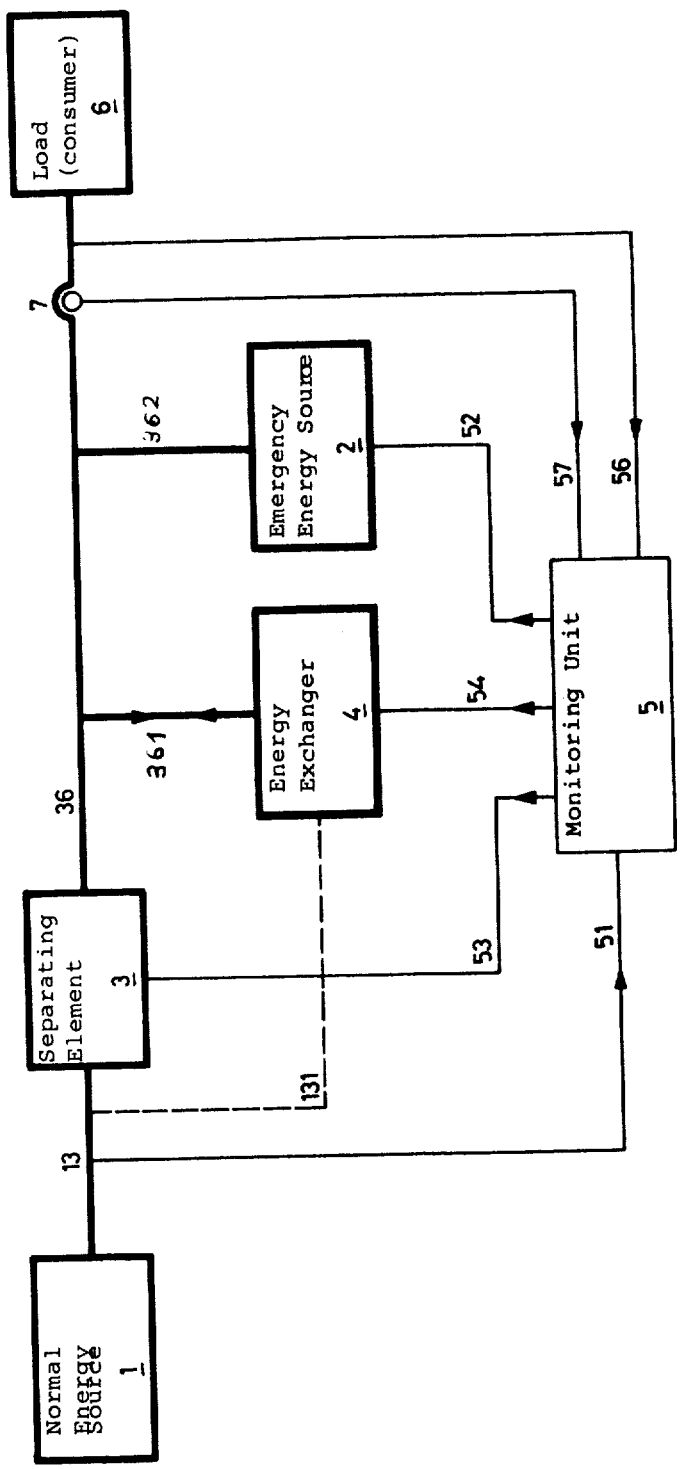
FIG. 1 is a simplified circuit diagram of electrical energy supply apparatus according to the invention.

Referring to FIG. 1, the apparatus comprises a main energy supply system 1 to which is connected a load 6 through a line 13, an isolating device 3 and a line 36.

Only one load 6 is shown but there could be more. Also connected to the load 6, by way of lines 361 and 362 respectively and the common line 36, are an energy store 4 and an auxiliary energy source 2. During normal operation, energy passes from the main supply system 1 through the line 13, the isolating device 3 which is then in the connecting condition, and the line 36 to the load 6. The auxiliary energy source, which may for example comprise a Diesel set with a generator or one or more static inverters supplied by accumulators or batteries normally in the charged up condition, is disconnected from the line 36. The store 4 is connected to the line 36 by means of the line 361 during normal operation, and either absorbs energy from the main supply system 1, as indicated by one of the illustrated arrow-heads or gives up energy to the load 6, as indicated by the other arrow. It will be assumed that the energy store 4 has absorbed sufficient energy and is in the standby condition during normal operation. As already mentioned, the isolating device 3 is in the connecting condition. A control or monitoring unit 5 receives over the line 56 an indication of the voltage level of the supply energy and over the line 57 a signal representative of the load current, which signal is formed by a current measuring instrument 7. When fluctuations of the current or voltage having durations in the range of about 10 to 100 $\mu$ Sec. occur they are detected by the unit 5. The monitoring unit comprises control logic which ascertain whether these variations of the voltage or current do or do not exceed an upper threshold value. If this threshold value is exceeded, the isolating device 3 is activated through the line 53 and breaks the connection between the main supply system 1 and the line 36 leading to the load 6. At the same time, the energy store 4 is so controlled through the line 54 that energy is fed from it through the lines 361 and 36 to the load 6. This transfer of energy takes place only while the fluctuations of the voltage or current are occurring. Thus, in many cases, the store 4 will only have to supply energy to the load 6 for a time of the order of a few $\mu$sec to msec while the auxiliary energy source 2 will remain inoperative. The function of the isolating device 3 is to prevent energy from the store 3 from draining back into the main supply system during times when the main system is disturbed or interrupted and the store has taken over the job of supplying the load 6. The energy store 4 is so constructed that it can receive large quantities of energy through the line 361 and can also give back large quantities of energy in a short time through the same line 361. The store thus has a very low energy consumption in its standby condition, and the losses occurring during the time when it gives up energy are negligible owing to the shortness of this time.

If the fluctuations of the main supply voltage or current during normal operation continue for a relative long time, for example a few seconds or minutes, the unit 5 acts to start up the auxiliary energy source 2 so that this takes over from the store 4 the job of supplying energy to the load 6. This is done as follows. During the time when the isolating device 3 has broken the connection of the main supply and the energy store 4 is supplying energy to the load 6, an interrogating action is performed by the unit 5 to see whether or not the main supply has been properly restored, the unit 5 receiving for this purpose a continuous indication of the conditions at the main supply output over the line 51. The unit 5 makes a series of interrogations of the main supply voltage and current. If, at one of the first few interrogations, it is determined that the main supply has been restored properly, the isolating device 3 and store 4 are so controlled that the main supply again takes up the job of supplying energy to the load 6. Otherwise, the store 4 continues to supply the load energy until a particular number of interrogations, corresponding to a predetermined suitable time lapse, have been performed. If then the main supply has still not been restored, the auxiliary source 2 is started up by appropriate control signals fed to it over the line 52. As soon as the auxiliary source 2 is in full operation, the store 4 ceases to supply load energy and in fact receives energy from the auxiliary source, but the isolating device is kept in its disconnecting condition. The construction of the sources 1 and 2, the store 4 and the unit 5 is made such that the load 6 is supplied with the desired form of energy and at optimum voltage conditions or optimum current conditions. For example, it may be desired to feed the load with purely sinusoidal voltages and currents whose distortions always lie within given tolerances. Alternatively, the load can be such that it can operate correctly only with trapezoidal voltages or currents and then the monitoring unit 5 ensures that such energy supply is present. Of course, there is required in this case a main supply system 1 which supplies these trapezoidal voltage curves or current curves. It is merely intended to indicate by this that the installation as shown can be adapted to varying types of supply system 1 and load.

Figure 2:
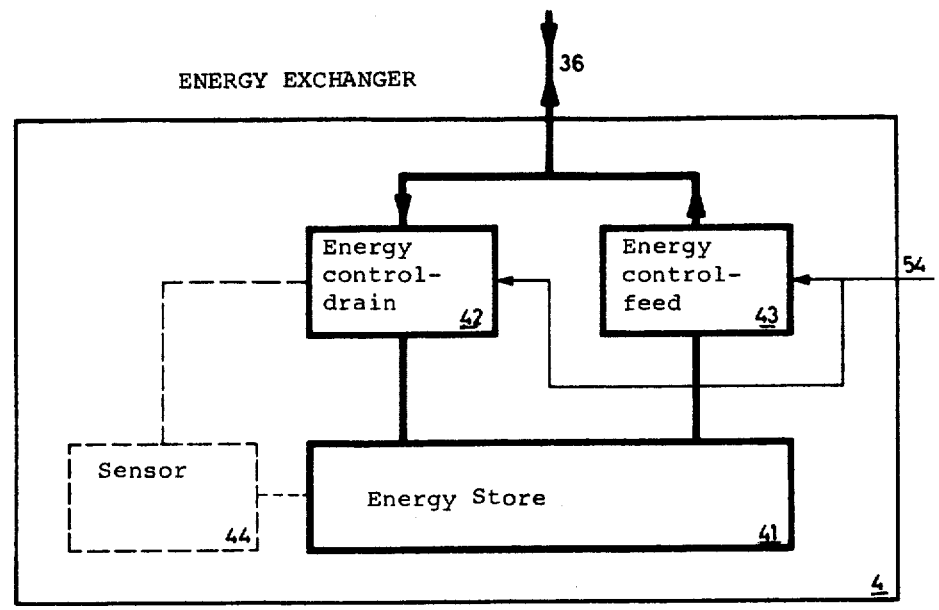
FIG. 2 is a simplified circuit diagram of energy storage means used in the FIG. 1 apparatus.

FIG. 2 shows in more detail the energy store 4. This comprises the actual storage element 41, which may consist for example of a plurality, even a large number, of capacitors or inductors, or one or more batteries or accumulators adapted to be rapidly discharged. The choice will be determined by the quantity of energy to be processed, i.e. the power of the whole installation, as also by the maximum time duration of energy supply fluctuations which the load 6 can tolerate and the amount of time for which the store 4 may be required to supply the load energy. The energy flow through the line 36, which may take place either from the supply system 1 in the direction of the store 4 or from the store 4 in the direction of the loads 6, is controlled in the store 4 by the drain switch unit 42 or the feed switch unit 43. The monitoring unit 5 controls these two energy control units 42, 43 through the line 54 and, during normal operation when no fluctuations of voltage and current are recorded through the lines 56, 57 in the monitoring unit 5, it controls the unit 42 through the line 54 in such manner that the filling of the energy store 41 continues until it is full or until it contains a required amount of stored energy (e.g. the case may readily arise where the energy store 41 is only to be half-filled). This depends upon the type, the size and the organisation of the energy store 41. Where it is necessary to control the amount of energy which enters the storage element 41, e.g. where it comprises a cell of the kind which can be damaged by overcharging or where it is required to fill the store to only a particular fraction of its total capacity, there can be provided a sensor 44 which detects when the store has been filled to the required amount and which then controls the unit 42 so as to stop further charging (or to reduce it to only a trickle charging level perhaps). As soon as fluctuations of the voltage and of the current are recorded in the monitoring unit 5 through the line 56, 57, the energy control drain unit 42 is closed and the energy control feed unit 43 is opened, and the device 3 simultaneously separates the supply system 1 from the load 6. These control steps are carried out by the monitoring unit 5.

Figure 3:
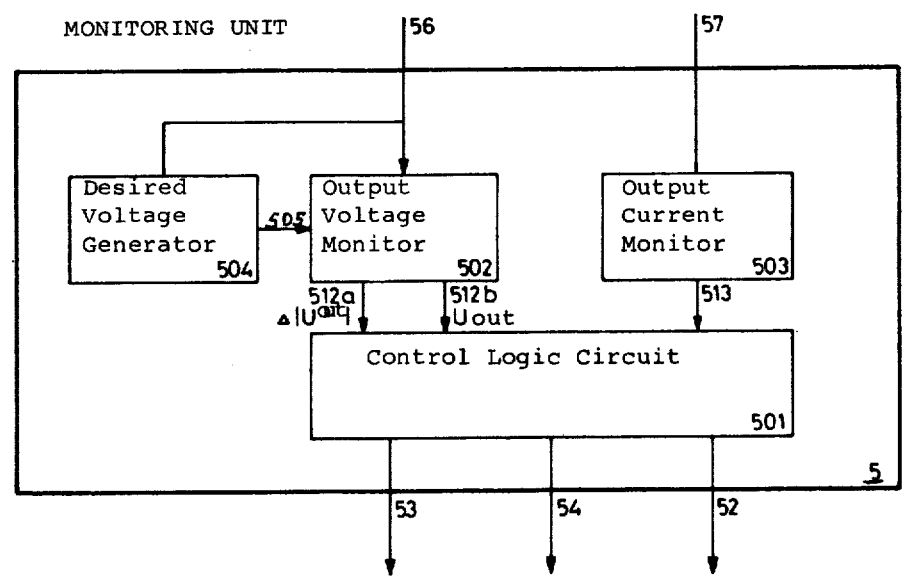
FIG. 3 is a simplified circuit diagram of control means used in the FIG. 1 apparatus.

Referring now to the control unit diagram of FIG. 3 fluctuations of the voltage and of the current at the load 6 are transmitted through lines 56 and 57 respectively to an output voltage monitor 502 and an output current monitor 503 in the control unit. The output voltage monitor 502 receives as reference value of the voltage a signal from a desired-value voltage generator 504, which may be constructed in various forms. For example, if the load energy has to have a sinusoidal waveform, it may be designed in the same form as the function generator 55, 56 according to German Pat. No. DT-PS; 2,025,743, to which U.S. Pat. No. 3,662,182 corresponds FIG. 2, in which a sinusoidal waveform is constructed from a series of separately generated small curve elements. This composite sine form will then pass through the line 505 as desired signal to the output voltage monitor 502 of FIG. 3. The desired-voltage generator 504 may alternatively be designed as a store in which the sampled values of a sine curve are stored, for example a read-only memory (ROM) in which sample values are fixedly stored and which do not become cleared of their information or sample value content during read-out. The read-out operation then takes place at a particular speed to give the desired frequency of the waveform and the individual sampled values are combined in the desired-voltage generator 504 to form a sinusoidal waveform signal which passes through the line 504 as desired signal into the output voltage monitor 502. With such an arrangement, it will be realised that the read-out speed can be varied so as to give varying frequencies of the output waveform. Similar arrangements may be used where the energy fed to the load 6 has to have a form other than sinusoidal, e.g. the aforementioned trapezoidal waveform. The generator 504 could be constructed so that, by appropriate control thereof, it supplies a selected one of several different waveforms whereby the same apparatus can be used for different types of main supply and load.

In the following, the manner of operation of the control unit 5 will be more particularly described with reference to FIGS. 1, 2, 3 and 5. During normal operation, the main energy supply system 1 supplies the load 6 through the line 36. The unit 5 continuously receives through the lines 56 and 57 information regarding the voltage and the current at the output of the continuous-current installation or at the input of the load 6. The desired-voltage generator 504 (FIG. 3) generates the desired wave form of the voltage, which passes through the line 505 into the output voltage monitor 502, in which the desired voltage from the generator 504 and the actual voltage through the line 56 are compared with one another. By way of the line 512a, the difference between the actual voltage and the desired voltage is fed into the control logic circuit 501. The control logic circuit receives through the line 512b the actual value of the output voltage, and the absolute magnitudes of the voltage values and of the variations of these voltage values are formed therein. If the difference Δ/Uout/ is smaller than a predetermined threshold value Δ/Umax/, the control logic circuit 501 is not set in operation. There also passes into the control logic circuit 501, from the output current monitor 503 through the line 513, the signal for the current Iout. In the flow chart of FIG. 5, there is symbolically illustrated. When the difference Δ/Uout/ is greater than the threshold value Δ/Umax/, the control logic circuit 501 is started. In the latter case, the three values of the difference of the output voltage Δ/Uout/, the energy E=UI and the output current Iout are related to one another by means of logic elements in the manner illustrated in FIG. 5. On the basis of the results, either the exchanger 4 and/or the isolating device 3, or again the auxiliary energy source 2, are activated through the lines 52, 53, 54 (FIG. 3).

Figure 4A:
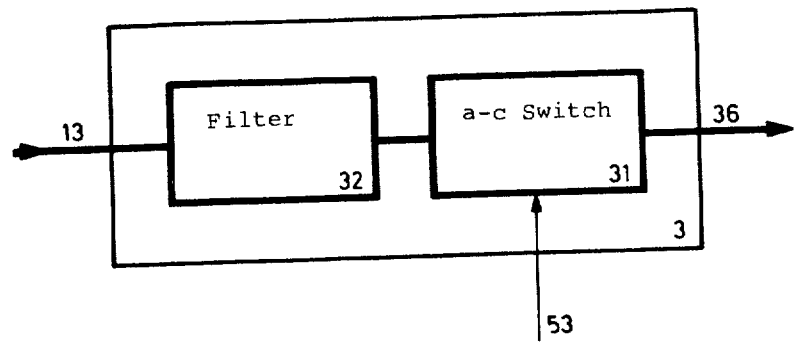
FIG. 4a and 4b are simplified circuit diagrams of respective embodiments of an isolating device used in the FIG. 1 apparatus.

It will now be assumed that the difference Δ/Uout/ of the difference between the actual voltage and the desired voltage is greater than the preset threshold value Δ/Umax/. Since absolute magnitudes are concerned, it does not matter whether the difference is related to the positive side or to the negative side of the voltage half-cycles. If the difference Δ/Uout/ is negative it may be said that energy E flows in a positive direction (i.e. by definition, we have positive energy flow from the supply system 1 to the load 6 and negative energy flow from the load 6 to the supply system 1), and that the current I is greater than 0, i.e. is a positive half-cycle. These decisions are made in the circuits 518, 519, 520 (FIG. 5). In the case under consideration, the circuit 521 is activated and finds as a result that an increase in the energy + ΔE is started by an increase of the current by + ΔI to the load. The control logic circuit 501 activates the device 3 and the energy exchanger 4 through lines 53, 54. The energy exchanger 4 (FIG. 2) gives up energy to the load 6 from its storage element 41 through the energy control feed 43 and by way of the line 36, while the device 3 has disconnected the main supply system. If the isolating device 3 consists of a thyristor arrangement as will be more particularly described with reference to FIG. 4a and 4b, the separation takes place automatically without the use of a separating signal from the control logic circuit 501 through the line 53 to the device 3. If the separating element 3 consists of other switches, the signal of the line 53 must be used for the actuation of these separating elements. According to FIG. 5, there is also transmitted from the circuit 528 through the line 536 a signal indicating the beginning of the supply of energy from exchanger 4 through the line 361 (FIG. 1) and 36 to the load 6. When the control logic circuit 501 receives through the line 51 (FIGS. 1 and 3) information that the reduction of the voltage has become normalised, the circuit 513 (FIG. 5) passes a signal through the line 516 to the circuit 514, so that the build-up of the connection of the units 518, 519, 520, 521, 528 is broken and the device 3 reconnects the system 1 and the energy control feed 43 (FIG. 2) is stopped. An "off" signal passes through the line 537 to the circuit 538 (FIG. 5). In this case, it will be assumed that the time t between the two signals is shorter than a preset upper time limit tmax. If, in another case, the time t (the time for which energy is passed from the store 41 of exchanger 4 to the load 6) is greater than this limit value tmax, the emergency energy source 2 is connected to the load through the line 362 by the unit 539 and through the line 52. At the same instant, the energy control feed 43 of the energy exchanger (FIG. 2) is disconnected by means of the line 54. A further case will now be considered, in which again the supply system 1 supplies its energy in a positive direction to the loads 6. In thiscase again, an inadmissible reduction of the actual voltage in relation to the desired voltage occurs, and hence a positive energy flow but, this voltage reduction is assumed to take place during the negative half-cycle of the current for more than 10 to 100 μ Sec, for example. According to FIG. 5, the circuit 513 supplies a corresponding signal to the succeeding circuit 514, which starts the control logic circuit 501 (FIG. 3). The circuit 518 detects through the line 517 that the difference Δ/Uout/ is smaller than 0. The circuit 519 detects that the energy is flowing in the positive direction +E. The circuit 520 detects that the current I is smaller than 0. The logic element 522 responds and applies to the unit 530 a corresponding output signal. This unit ensures that an energy increase + ΔE is initiated by reduction of the current of − ΔI. In addition, the device 3 must disconnect the supply system 1. The control logic circuit 501 applies the corresponding control signals through the lines 53 and 54 to the device 3 and to the exchanger 4. The time for which the exchanger 4 is connected to the load 6 is again detected in the unit 538 through the line 537. Should the time t be greater than a preset limit value tmax, the emergency energy source 2 is set in operation through the unit 539. This is done by the control logic circuit through the line 52. In FIG. 5, there are indicated all the contingencies which may arise. If, for example, the difference Δ/Uout/ is greater than a preset limit value Δ/Umax/ (circuit 513), the starting takes place in the circuit 514. This is a fundamental pre-requisite for the further logical association of information in the units 513 to 533. The logic element 523 applies an output signal to the unit 531 when the voltage difference is smaller than 0 (unit 518), and the energy E flows in the negative direction (from the load 6 into the supply system 1, unit 519) with a positive current half-cycle (unit 520). In this case, it would not be desirable to effect an energy increase + ΔE by increasing the load current by ΔI by means of the exchanger 4. In this case, the supply system 1 would be separated from the load 6 by the device 3. This generally takes place in a very short time owing to the inductances which are always present on the load side and which cause a negative energy flow to occur. After a few milliseconds, this state is terminated, so that the device 3 can reconnect the supply system 1 to the load 6 through the control logic circuit 501. The units 524 and 532 of FIG. 5 are activated substantially in the same case as just described, except that the negative energy flow takes place with a negative current half-cycle. In this case, the same actions are applied as have already been discurred with reference to the units 523 and 531. The next units 525, 532 of the control logic circuit 501 are activated in accordance with FIG. 5 when the difference Δ/Uout/ is greater than 0 (unit 518) and the energy flows in the positive direction with positive current half-cycle. This case arises when the output voltage (line 56) has suddenly risen in relation to the desired voltage from the desired-voltage generator 504. In this case, the energy must be lowered by ΔE in accordance with unit 532 by corresponding reduction of the current by an amount ΔI. In addition, the device 3 must cut out the supply system 1. The next units 525, 533 of FIG. 5 are activated in the same case as just described, except that this case occurs within the negative current half-cycle. The units 527 and 535 of FIG. 5 respond when a voltage increases has taken place (unit 518), and the energy is flowing in the negative direction from the load 6 into the supply system 1 (unit 519) with positive current half-cycle (unit 520). In this case, the energy must be lowered by ΔE by reduction of the current by ΔI, and the device 3 must not disconnect the supply system 1. The next units 528 and 536 of the control logic circuit 501 according to FIG. 5 respond in the same case as just described, except that this case occurs with negative current half-cycle.

In all these eight cases, the unit 538 is provided to ensure that the exchanger 4 and its energy store 41 are turned on only for a particular time. When the maximum time tmax is exceeded, the emergency energy source 2 takes over the action of the store 41. The energy source 2 always starts in phase with the voltage at the load 6. It is set in operation to bridge relatively long disturbances. According to FIG. 5, this starting has taken place after a certain time (unit 538). However, it is also possible for the unit 538 to take as its yardstick, not the time, but the energy content of the energy exchanger 4. When the energy content slowly declines, the unit 538 of FIG. 5 can turn on the emergency energy source 2.

During the operation of the emergency energy source 2 on the loads 6, the current and voltage conditions are monitored through the lines 56, 57. Should a disturbance be caused by one of the loads 6, the store 41 is reconnected to the loads 6 through the line 361 in order to eliminate the aforesaid brief disturbance. FIG. 4a illustrates a form of construction of the isolating device 3, which consists substantially of a filter 32 and of static alternatingcurrent switches. If thyristors are employed as the switches 31, a forced commutation or a separate control is generally necessary. These thyristors may also have self-control if the power supplied to the loads 6 is only to be protected to a limited extent with respect to voltages, of if overvoltages only rarely occur in the supply system. The filter 32 eliminates all disturbances which could not be eliminated either by the exchanger 4 or by the static switch 31. Such disturbances are generally in the region of less than 10 μ Sec. In its simplest form, the filter 32 consists of an LC element whose value is determined mainly by the speed of the store 4.

Figure 4B:
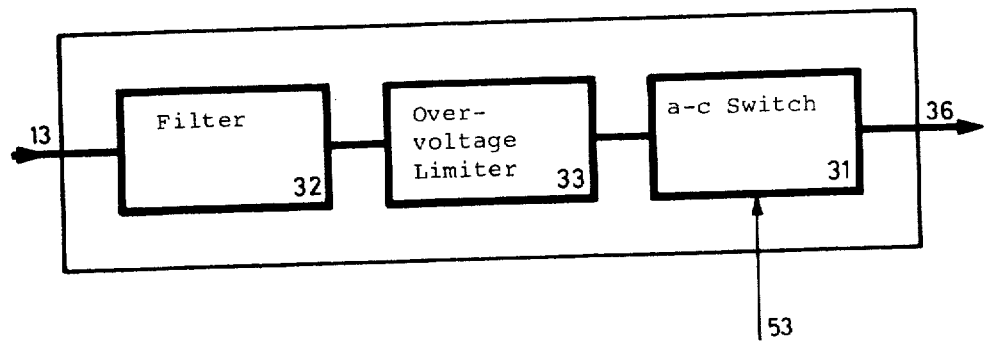
Figure 5:
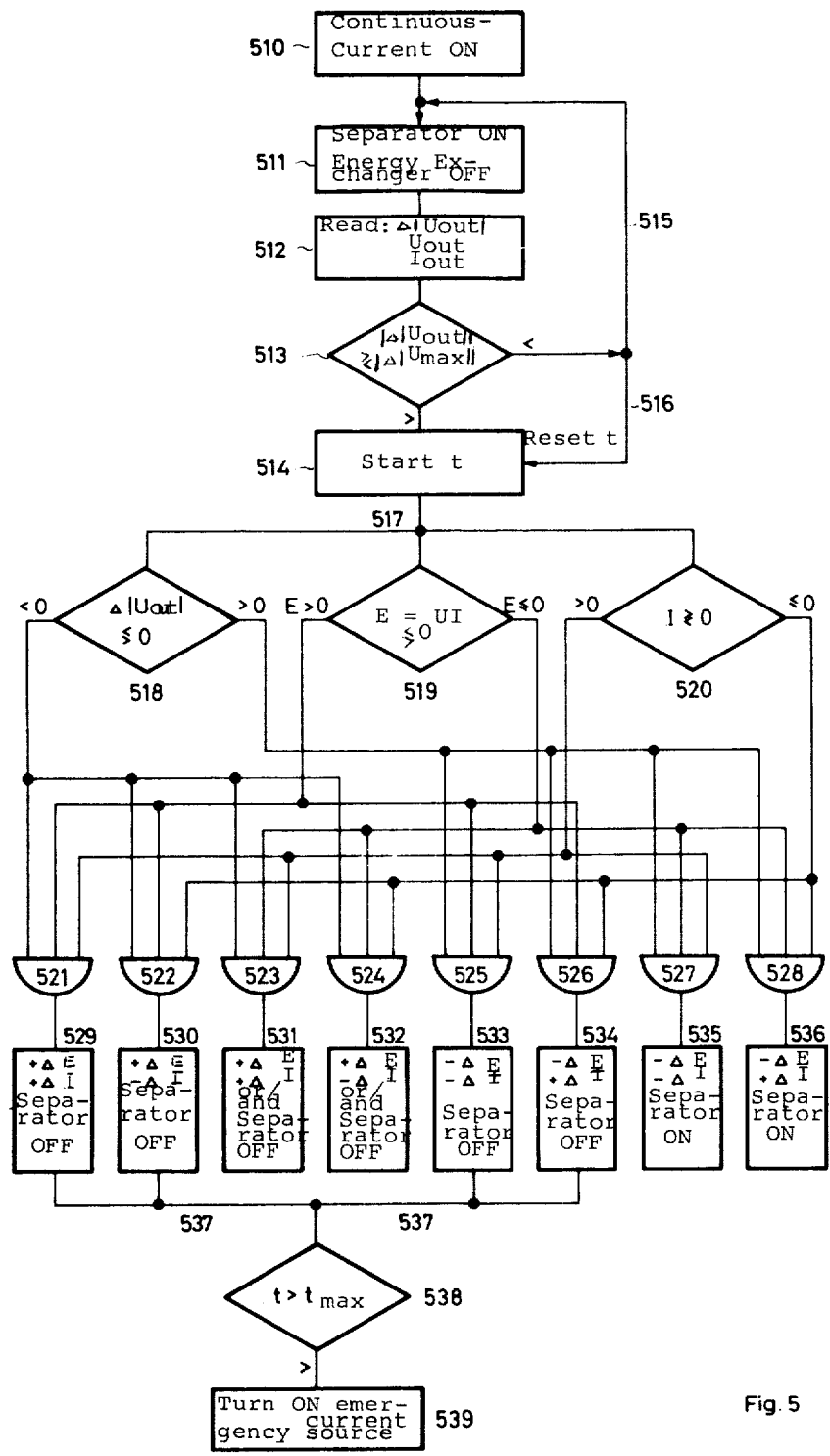
FIG. 5 is an operative flow chart for explaining the operating sequence of the FIG. 1 apparatus.

In FIG. 4b, an overvoltage limiter 33 is provided between the filter 32 and the alternating-current switch 31. The said overvoltage limiter 33 can comprise a contactor which responds to overvoltages induced, for example, by lightning strokes. Voltage-dependent resistors based upon metallic oxide and having a response time of a microsecond and an energy absorption of several hundred joules are today commonly obtainable and such a resistor could be used as an alternative kind of overvoltage limiter. If the exchanger 4 is particularly sturdily designed, the alternating-current switch 31 in the device 3 may be omitted. In this way, losses at these semiconductors are eliminated.

The energy losses of the embodiment illustrated in FIG. 1 during normal operation, i.e. when the normal current supply system 1 is operating on the load 6, are very small. During operation with the emergency energy source 2 connected, the losses are increased by a multiple. It is here to be noted that the aforesaid high losses can only occur with the described and illustrated apparatus during the time in which the emergency energy source 2 is operating and so any ventilating or cooling system which is provided in order to remove the heat, which is the form in which the loss energy appears, need not be so large as would be the case if the loss were continuous. The high heat losses occurring during brief emergency operation (with the supply system 1 disconnected) are either dissipated by the existing ventilation or cooling systems, which are adapted to withstand brief overloading, but are of small dimensions, or they are temporarily stored in a heat store. The heat store, in which water or other liquid having high heat capacity is employed as the storage medium, stores the high heat losses during the brief operation from the emergency energy source 2. This heat can be dissipated by the existing ventilating or cooling installation over a relatively long period of time. It is also possible for the heat to be dissipated from the store by other means, for example by exchange of the actual cooling liquid, more particularly water. Owing to the smaller dimensions of the cooling or ventilating system, the capital outlay for the whole continuous-current supply system can be reduced.

We claim:

1. Apparatus for supply pulsed, or alternating electrical energy of a desired predetermined, wave shape to a load (6) comprising
    energy supply means (1, 2, 36) which includes
    a main energy supply device (1),
    an auxiliary energy supply device (2);
    an output conductor portion (36) connected to said energy supply devices (1, 2) and to the load (6),
    said main energy supply device (1) supplying energy to said output conductor portion (36) to supply energy to the load under normal condition;
    said auxiliary energy supply device (2) supplying energy to said output conductor portion to supply energy to the load during interruption of the main energy supply respectively;
    and means correcting for departures from, or distortion of the wave shape from said desired predetermined wave shape including
    energy exchange and storage means (4) connected to the main energy supply device (1) to receive and store energy from said main supply device (1) and to make such stored energy instantantaneously available to said load for bridging brief disturbances in the supply of energy to the load from said energy supply means resulting in departure from or distortion of the wave shape with respect to the said desired wave shape;
    and control means (5) which are connected to said energy exchange and storage means (4) comprising
    reference means (504) generating a reference signal having a characteristic representative of the desired wave shape of energy to be supplied to said load (6);
    actual energy supply monitoring means including an output voltage monitor (502) and an output current monitor (503) evaluating the instantaneous levels of energy being supplied to the load;
    comparator means (502) connected to said energy supply monitoring means and comparing the instantaneous level of the half wave current level and the flow direction of the energy actually supplied to the load and the instantaneous level of said reference signal,
    and control logic means (501) connected to said comparator means (502) and controlling said energy exchange and storage means (4) in dependence on the instantaneous energy level and the flow direction of said supplied energy to instantaneously supply energy stored from said energy exchange and storage means to the output conductor portion (36) and hence the load (6).

2. Apparatus according to claim 1, further including an isolating device (3) connected between said energy exchange and storage means (4) and the main energy supply device (1) to prevent energy from the energy exchange and storage means (4) from flowing into the main energy supply device (1).

3. Apparatus according to claim 2, wherein the control means (5) is further connected to said isolating device (3) and said auxiliary energy supply device (2);
    and the control logic means (501) of said control means (5) additionally controls said isolating device (3) and said auxiliary energy supply device (2) in dependence on evaluated voltage and current levels of the energy supplied to the load.

4. Apparatus according to claim 2, wherein said isolating device (3) comprises a filter (3) and an alternating current switch (31) connected to the filter.

5. Apparatus according to claim 4, wherein said isolating device (3) further comprises an over-voltage limiter (33) connected to the said filter (3) and the said switch (31).

6. Apparatus according to claim 1, wherein said energy exchange and storage means (4) comprises
    an energy source (41),
    and first and second switch means (42 and 43) which are connected between the energy store (41) and the energy supply means (1, 2, 36) and are operable to control the flow of energy, respectively, to and from the energy store (41).

7. Apparatus according to claim 1, wherein the energy exchange and exchange means (4) comprises input-/output conductor means (361) connected to the output conductor portion (36) of the energy supply means (1, 2, 36) to pass energy to and from the output conductor portion (36) and the energy exchange and storage means (4).

8. Apparatus according to claim 7, wherein the energy exchange and storage means (4) further comprises an energy store (41) having a storage capacity which is small with respect to said auxiliary energy supply device (2), the energy store (41) receiving and delivering, respectively, energy from and to the input/output conductor means (361).

9. Apparatus according to claim 1, further including an isolating device (3) connected between said energy exchange and storage means (4) and the main energy supply device (1) to prevent energy backflow from the energy exchange and storage means (4) from flowing into the main energy supply device (1),
    said isolating device (3) comprising
    at least one thyristor switch connected to and controlled by said control means (5).

10. Apparatus according to claim 1, further including an isolating device (3) connected between said energy exchange and storage means (4) and the main energy supply device (1) to prevent energy backflow from the energy exchange and storage means (4) from flowing into the main energy supply device (1),
    said isolating device (3) comprising
    static a-c switch means (31) connected to and controlled by the control means (5), said control means providing at least an ON signal to said switch means (31).

* * * * *